(12) United States Patent
Walley (10) Patent No.: US 7,851,941 B2
(45) Date of Patent: Dec. 14, 2010

(54) METHOD AND SYSTEM FOR A MULTIPLE OUTPUT CAPACITIVE BUCK/BOOST CONVERTER

(75) Inventor: John Walley, Ladera Ranch, CA (US)

(73) Assignee: Broadcom Corporation, Irvine, CA (US)

( * ) Notice: Subject to any disclaimer, the term of this patent is extended or adjusted under 35 U.S.C. 154(b) by 200 days.

(21) Appl. No.: 12/138,910

(22) Filed: Jun. 13, 2008

(65) Prior Publication Data

US 2009/0309417 A1    Dec. 17, 2009

(51) Int. Cl.
*H02J 1/10* (2006.01)
*H02J 3/38* (2006.01)
*H02J 7/34* (2006.01)

(52) U.S. Cl. ............................................. 307/18
(58) Field of Classification Search .............. 307/11, 307/18, 33, 38
See application file for complete search history.

(56) References Cited

U.S. PATENT DOCUMENTS 7,342,389 B1 * 3/2008 Wu et al. .................... 323/288
2009/0108681 A1 * 4/2009 Litovsky .................... 307/110
2009/0160421 A1 * 6/2009 Nguyen et al. ............. 323/318

\* cited by examiner

*Primary Examiner*—Jared J Fureman
*Assistant Examiner*—Carlos Amaya
(74) *Attorney, Agent, or Firm*—McAndrews, Held & Malloy, Ltd.

(57) ABSTRACT

Methods and systems for a multiple output capacitive buck/boost converter are disclosed and may include charging one or more input capacitors via an input voltage. One or more output voltages may be generated on a chip by switching the charged input capacitors to output capacitors via a switch array on the chip. The switch array may be controlled via a state machine. A constant current and/or voltage may be generated for the one or more output voltages via one or more current and/or voltage comparators. A variable resistance may be coupled in series with one or more switches in the switch array. The one or more input capacitors may be discrete capacitors external to the chip and/or integrated within the chip. One or more of the output voltages may be greater than the input voltage, or may be less than the input voltage.

20 Claims, 5 Drawing Sheets

METHOD AND SYSTEM FOR A MULTIPLE OUTPUT CAPACITIVE BUCK/BOOST CONVERTER

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to integrated circuit power control. More specifically, certain embodiments of the invention relate to a method and system for a multiple output capacitive buck/boost converter.

BACKGROUND OF THE INVENTION

Electronic circuits typically require a bias voltage for proper operation. The voltage level required by a circuit depends on the application. A circuit for transmitting electromagnetic radiation may require a higher voltage than a circuit used for processing data. The optimum voltage may be determined by the bias voltage requirements of the transistors, or other active devices, within the circuit.

A bipolar transistor circuit may require a higher voltage in amplifier applications to avoid saturation of the amplifier, as opposed to switching operations, for example. CMOS circuits in a mobile communication device may require a low voltage to drive the MOSFETs in the circuit.

Furthermore, as device sizes continue to shrink for higher speed and lower power consumption, a high voltage may degrade performance and cause excessive leakage. With thinner gate oxides, gate leakage current may become significant using historical bias voltages, thus driving gate voltages lower. However, if a transmitter/receiver may be integrated in the same device, a higher bias voltage may also be required. Bias voltages are typically DC voltage, and may be supplied by a battery. However, there may be noise in the bias voltage, which may be mitigated by capacitive filters. The variable output voltage of batteries my affect operation of battery powered devices.

Bias voltages are typically DC voltage, and may be supplied by a battery. Noise in the bias voltage may be reduced by capacitive filters. Devices must be capable of operating over a large range of voltage due to the variable output voltage capability of batteries.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for a multiple output capacitive buck/boost converter, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for a multiple output capacitive buck/boost converter. Exemplary aspects of the invention may comprise charging one or more input capacitors via an input voltage. One or more output voltages may be generated on a chip by switching one or more of the charged input capacitors to one or more output capacitors via a switch array on the chip. The switch array may be controlled, for example, via a state machine. A constant current may be generated for the one or more output voltages via one or more current comparators and/or a constant voltage may be generated for the one or more output voltages via one or more voltage comparators. A variable resistance may be coupled in series with one or more switches in the switch array. The one or more input capacitors may be discrete capacitors external to the chip or integrated within the chip. One or more of the output voltages may be greater than the input voltage, or may be less than the input voltage.

Figure 1:
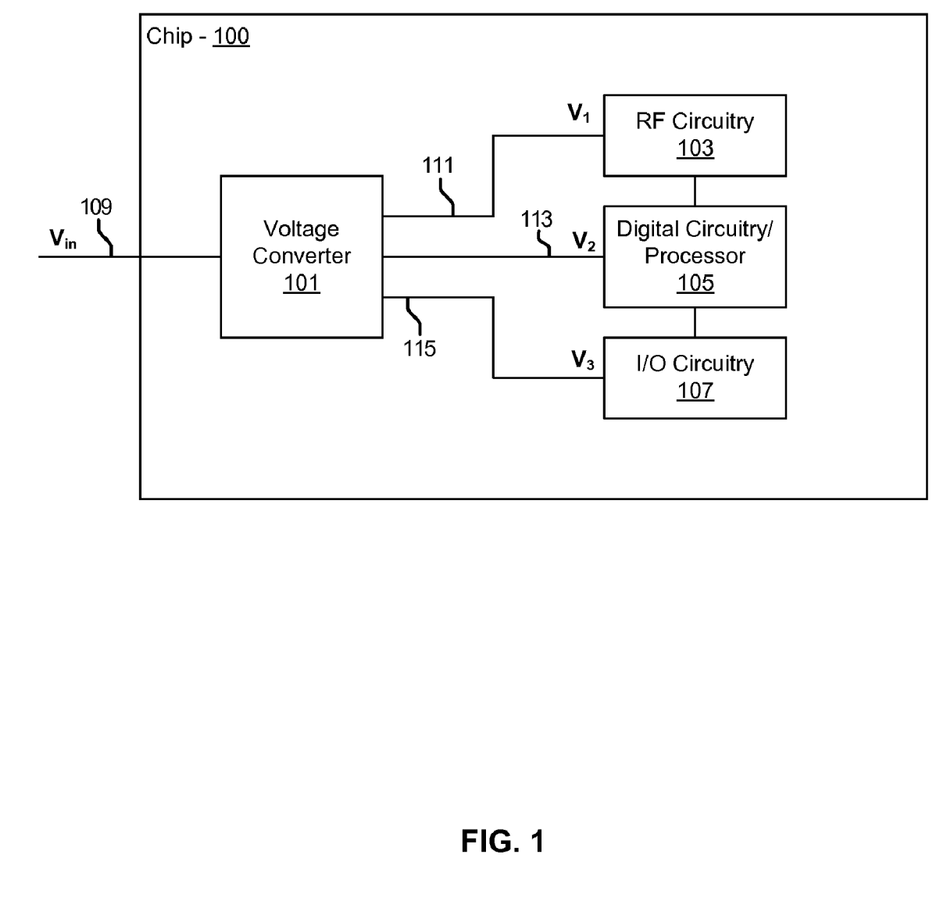
FIG. 1 is a block diagram of an exemplary single input, multiple output buck/boost converter on a chip, in accordance with an embodiment of the invention.

FIG. 1 is a block diagram of an exemplary single input, multiple output buck/boost converter on a chip, in accordance with an embodiment of the invention. Referring to FIG. 1, there is shown chip 100 comprising a voltage buck/boost converter (VBC) 101, an RF block 103, a digital block 105 and an IO block 107. There is also shown voltages $V_{IN}$ 109, $V_1$ 111, $V_2$ 113 and $V_3$ 115. The voltage $V_{IN}$ 109 may comprise an input voltage to the chip 101 and may be generated by a battery or other power source, for example.

The VBC 101 may comprise suitable circuitry, logic and/or code that may enable converting an input voltage into multiple higher or lower voltages that may be utilized by other circuitry, such as the RF block 103, the digital block 105 and/or the IO block 107, on the chip 100. The VBC 101 may comprise a capacitive buck/boost converter that may switch in and out different capacitive loads that may accept charge and thus generate a voltage dependent on the capacitance of the capacitive element, the current level and the time taken to transfer the charge. This process may be described further with respect to FIG. 3.

The number of output voltages, $V_1$ 111, $V_2$ 113 and $V_3$ 115, and associated circuitry blocks, may not be limited as shown and disclosed with respect to FIG. 1. Accordingly, any number of circuitry blocks and output voltages may be utilized, depending on the capability of the source voltage, $V_{IN}$ 109 and the VBC 101.

The RF block 103 may comprise suitable circuitry, logic and/or code that may enable the amplification, transmission and reception of RF signals, and as such may require higher voltages for operation in comparison to lower voltage digital circuits. The RF block 103 may comprise mixers, programmable gain amplifiers and power amplifiers, for example.

The digital block 105 may comprise suitable circuitry, logic and/or code that may enable the control of the RF block 103 and the IO block 107. The digital block 105 may comprise a processor, for example, that may enable the processing of baseband signals, the control of input/output functions in the IO block 107 and/or the mixing and amplification of RF signals, for example, in the RF block 105. The digital block 103 may also enable the control of the VBC 101.

The IO block 107 may comprise suitable circuitry, logic and/or code that may enable the transmission and reception of electrical signals communicated between the chip 100 and a system that utilizes the chip 101, such as a cellular phone, for example. The IO block 107 may convert electrical signals to an appropriate format required by an external device, and conversely may convert signals received from a system external to the chip 100 to a format suitable for the digital block 105 and the RF block 103, for example.

In operation, a power source, such as a battery, for example, may communicate an input voltage, $V_{IN}$ 109, to the VBC 101. The VBC 101 may convert the input voltage $V_{IN}$ 109 to a plurality of voltages as required by the circuitry coupled to the VBC 101. The output voltages, $V_1$ 111, $V_2$ 113 and $V_3$ 115 may provide power to the RF block 103, the digital block 105 and the IO block 107, respectively. The VBC 101 may monitor the load levels of each of the RF block 103, the digital block 105 and the IO block 107, and may adjust the charge transferred to a block in instances where that particular block may be drawing a higher or lower level, such that the input voltage to that block may decrease or increase.

Figure 2A:
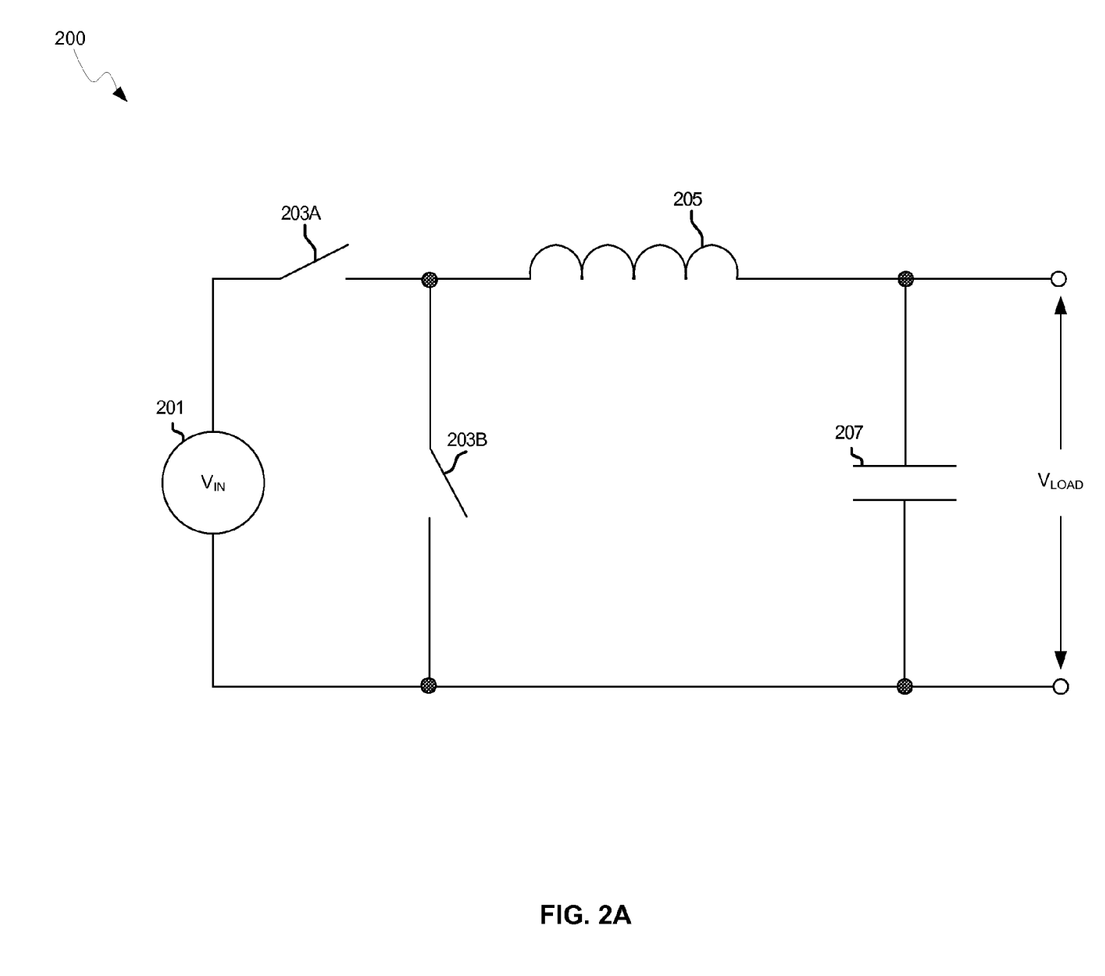
FIG. 2A is a block diagram of an exemplary capacitive/inductive buck converter, in connection with an embodiment of the invention.

FIG. 2A is a block diagram of an exemplary capacitive/inductive buck converter, in connection with an embodiment of the invention. Referring to FIG. 2A, there is shown a voltage converter 200 comprising a voltage source 201, switches 203A and 203B, an inductor 205 and a capacitor 207. The voltage source 201 may comprise suitable circuitry, logic and/or code that may enable generating a source voltage, $V_{IN}$, which may be utilized to generate a lower output voltage, $V_{Load}$, at the output of the voltage converter 200. The switch 203A may be utilized to transfer the input voltage, $V_{IN}$, into the circuit comprising the inductor 205 and the capacitor 207. The switch 203B may be utilized to short across the inductor 205 and the capacitor.

In operation, the input voltage $V_{IN}$, may be communicated to a terminal of the inductor 205 by closing the switch 203A and opening the switch 203B. The voltage across the inductor 205 may be a function of the inductance of the inductor 205 and the time derivative of the current, and may be equal to $V_{IN}-V_{Load}$. Conversely, by opening the switch 203A and closing the switch 203B, the voltage generated across the inductor 205 may start decreasing to the value of $V_{Load}$. This switching sequence may be repeated on a periodic basis, with the duty cycle, defined by the time that the switch 203A may be closed divided by the total period of the switching cycle, determining the value of the output voltage $V_{Load}$. The capacitor 207 may be large enough to keep the output voltage $V_{LOAD}$ essentially constant in steady state.

The circuit described in FIG. 2A may be utilized to generate a lower output voltage from a higher voltage input source. However, only one output voltage may be generated. The generation of multiple output voltages may be accomplished with a multiple stage capacitive/inductive converter, and is described, for example, with respect to FIG. 2B.

Figure 2B:
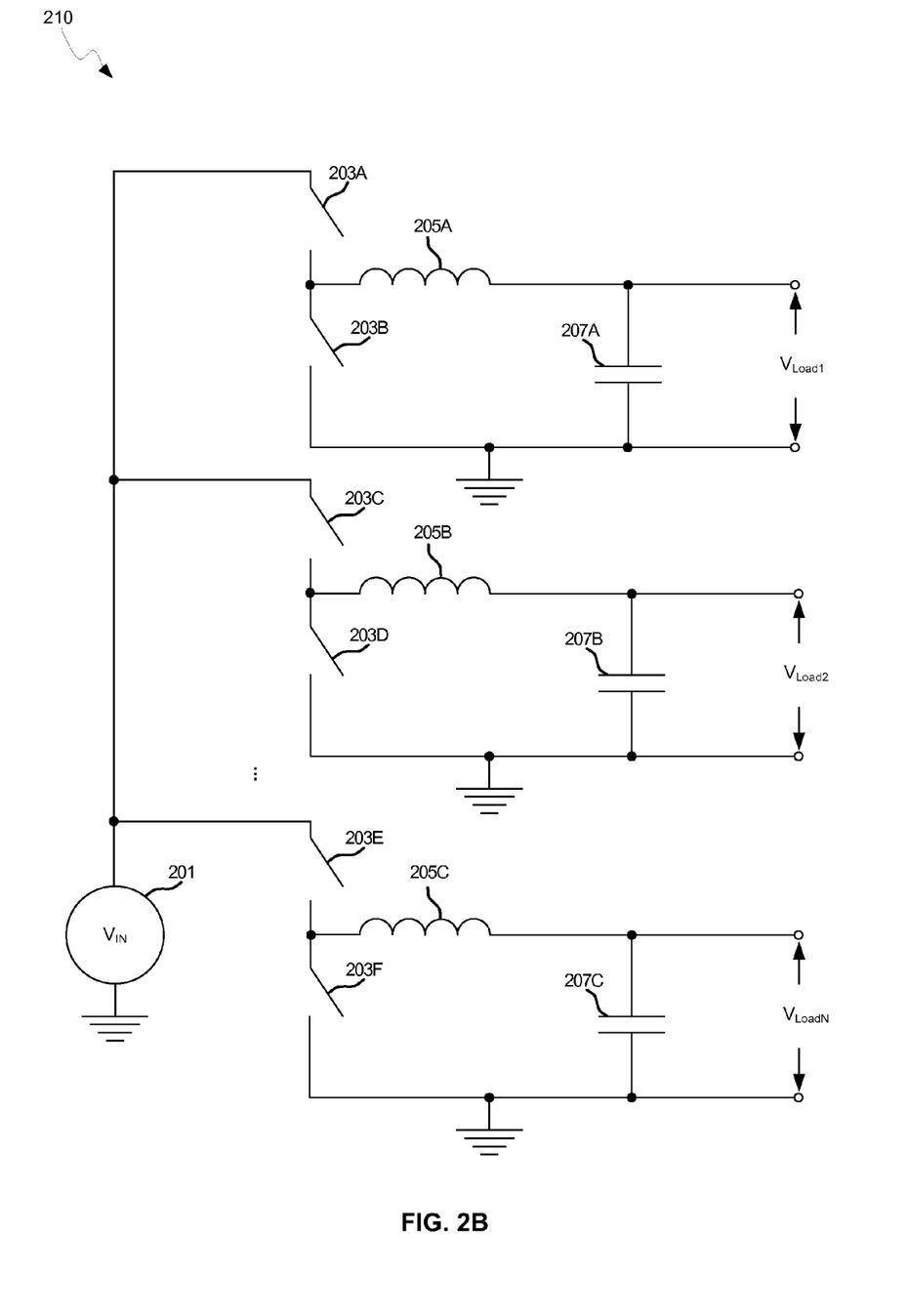
FIG. 2B is an exemplary multi-stage capacitive/inductive buck converter, in connection with an embodiment of the invention.

FIG. 2B is an exemplary multi-stage capacitive/inductive buck converter, in connection with an embodiment of the invention. Referring to FIG. 2B, there is shown a voltage converter 210 comprising a voltage source 201, switches 203A, 203B, 203C, 203D, 203E and 203F, inductors 205A, 205B and 205C, and capacitors 207A, 2907B and 207C. The switches 203A and 203B may be as described in FIG. 2A and may be substantially similar to the switches 203C, 203D, 203E and 203F. The inductors 205A, 205B and 205C may be substantially similar to the inductor 205, described with respect to FIG. 2A, and the voltage source 201 may be as described in FIG. 2A.

Each stage of the multi-stage converter 210 may comprise two switches and an inductor and capacitor, such as the switches 203A and 203B, the inductor 205A and the capacitor 207A, which may comprise the $1^{st}$ stage. The switches 203E and 203F, the inductor 205C and the capacitor 207C may comprise an N-th stage of the multi-stage converter 210.

In operation, the input voltage $V_{IN}$, may be communicated to a terminal of the inductor 205A by closing the switch 203A and opening the switch 203B. The voltage across the inductor 205A may be a function of the inductance of the inductor 205A and the time derivative of the current, and may be equal to $V_{IN}-V_{Load1}$. Conversely, by opening the switch 203A and closing the switch 203B, the voltage generated across the inductor 205A may start decreasing to the value of $V_{Load1}$. This switching sequence may be repeated on a periodic basis, with the duty cycle defined by the time that the switch 203A may be closed divided by the total period of the switching cycle, determining the value of the output voltage $V_{Load}$. The capacitor 207A may be large enough to keep the output voltage $V_{LOAD}$ essentially constant in steady state.

In the same manner, the output voltages $V_{Load2}$ up to $V_{LoadN}$ may be generated by utilizing the same switching sequence in each of the stages. This may enable the generation of multiple output voltages. However, an inductor may be required for each stage which may significantly increase system cost and may utilize excessive space within the system, which may comprise a cellular phone, for example.

Figure 3:
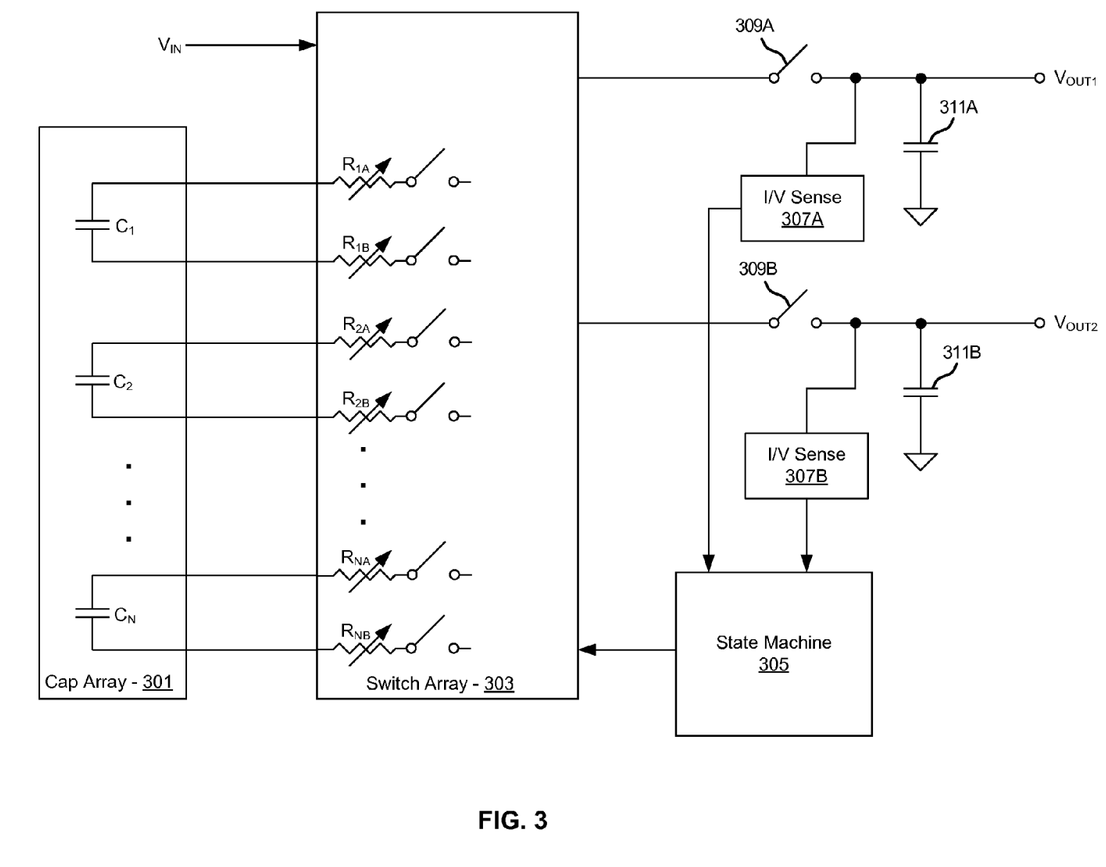
FIG. 3 is a block diagram of an exemplary multi-stage capacitive voltage converter, in accordance with an embodiment of the invention.

FIG. 3 is a block diagram of an exemplary multi-stage capacitive voltage converter, in accordance with an embodiment of the invention. Referring to FIG. 3, there is shown a capacitor array 301, a switch array 303, a state machine 305, current/voltage (I/V) sense blocks 307A and 307B, switches 309A and 309B, and capacitors 311A and 311B. There is also shown voltages $V_{IN1}$, $V_{OUT1}$, and $V_{OUT2}$. The number of output voltage signals is not limited to the number shown in FIG. 3. Accordingly, any number of IN sense blocks and output capacitors may be utilized for any number of output voltages as defined by system requirements.

The capacitor array 301 may comprise an array of capacitances defined by discrete capacitors and/or capacitances integrated within the chip 100, for example. The number of capacitors may enable the configuration of a larger number of output voltages and with a higher efficiency. The capacitor array 301 may be programmably controlled by, for example, the state machine 305 and/or a controller or processor.

The switch array 303 may comprise an array of CMOS transistors, for example, that may enable switching the input voltage $V_{IN}$, to one or more capacitors in the capacitor array 301, and then to one or more output switches, such as the output switches 309A and 309B. In an embodiment of the invention, the switch array may also comprise variable resistances in the switch paths to limit the current peaks in the circuit which may reduce noise. The resistance may be changed dynamically versus the switching rate and capacitance values to ensure maximum power transfer with minimum noise generation, and may be programmably controlled by, for example, the state machine 305 and/or a controller or processor.

The state machine 305 may comprise suitable circuitry, logic and/or code that may enable the control of the switch array 303. The state machine 303 may receive as inputs, voltage and/or current signals from the IN sense blocks 307A and 307B. The state machine 305 may utilize intelligent switching, via algorithms, for example, of the switch array 303 to optimize the efficiency of the charge transfer process utilized to generate output voltages from the input voltage $V_{IN}$.

The IN sense blocks 307A and 307B may comprise suitable circuitry, logic, and/or code that may enable monitoring of the output voltages $V_{OUT1}$, and $V_{OUT2}$, as well as the current supplied by these voltages. Accordingly, the IN sense blocks 307A and 307B may comprise current and/or voltage comparators for sensing current and/or voltage. In this manner, the efficiency of the generation of the desired output voltage may be increased by proper selection of capacitance by the switch array 303 via the state machine 305.

The output switches 309A and 309B may comprise CMOS switches, for example, that may enable coupling the switch array 303 to the output capacitors 311A and 311B.

The output capacitors 311A and 311B may comprise discrete capacitors and/or capacitors integrated on a chip, such as the chip 100 described with respect to FIG. 1. The output capacitors 311A and 311B may enable noise reduction in the output voltages $V_{OUT1}$, and $V_{OUT2}$.

In operation the capacitors $C_1, C_2, \ldots C_N$ may be charged up by the input voltage $V_{IN}$. In another embodiment of the invention, the capacitors $C_1, C_2, \ldots C_N$ may be charged by the voltage $V_{IN}$ minus an output voltage, $V_{OUT1}$ or $V_{OUT2}$. In an exemplary embodiment of the invention, the capacitors $C_1, C_2, \ldots C_N$ may have comparable or smaller values than the output capacitors 311A and 311B, and may be subsequently discharged to one of the $V_{OUT}$ ports.

The switch array 303 may be utilized to connect the capacitors $C_1, C_2, \ldots C_N$ to $V_{IN}$ and/or $V_{IN}$ minus $V_{OUT}$ in order to maximize the efficiency. The switches may be used to select how the capacitors may connect to the $V_{OUT}$ ports in order to maximize the efficiency.

The state machine 305 may monitor the input and output voltages and determine an appropriate switching sequence which may generate the most efficient output possible as well as keep voltage ripple to a minimum.

The output voltages $V_{OUT1}$ and $V_{OUT2}$ may have current and voltage regulation utilizing the IN sense blocks 307A and 307B, such as may be needed to charge a lithium battery or to provide outputs with current limiting, for example. To reduce the output current capability in a charge transfer system, the state machine 305 may regulate the amount of charge being sent to the output, which may be adjusted by reducing the frequency at which charge may be sent to the desired output port, such as $V_{OUT1}$ or $V_{OUT2}$. for example. The IN sense blocks 307A and 307B may provide feedback to the state machine 305 the state of the input and output voltages and currents.

Charge transfer may proceed by charging up the capacitors $C_1, C_2, \ldots C_N$ and pushing that charge to the output voltage ports. For example, a simple voltage doubler circuit would charge two capacitors by $V_{IN}$ in parallel and push that charge to the output port with the charged capacitors connected in series.

In instances where the desired output voltage may be lower than the input voltage, $V_{IN}$, the charge transfer may be enabled by the switch array 303 and the state machine 305 by charging the capacitors $C_1, C_2, \ldots C_N$ in series and subsequently connecting them to the output in parallel.

In order to maintain maximum efficiency, minimizing the capacitance*voltage squared*frequency ($C*V^2*F$) power losses, for example, where V may equal the voltage change during the discharge cycle, the input capacitors $C_1, C_2, \ldots C_N$ may be charged such that the voltage across the capacitors may be approximately $V_{IN}$ before charge starts and discharged when the capacitors are close to $V_{OUT}$ when discharged. Otherwise, the $C*V^2*F$ power dissipation losses may reduce the conversion process to the same efficiency as a linear regulator.

The order of the charge/discharge sequence may be changed to reduce ripple, for example. The frequency of the input and output charge transfers may be different or may be the same, and the selection of the capacitor combinations may be changed in order to maximize efficiency.

In instances when the output is a multiple of the input, the efficiency may be very high, >90%, for example. In order to ensure high efficiency when the output may not be a multiple of the input, the sequence may require more complex switching sequences. For example, in instances where the input voltage, $V_{IN}$, may equal 1.8V, and the desired output voltage $V_{OUT1}$ may equal 1.2V, the charge switching process may comprise: Charge $V_{IN}$ to $C_1+C_2+C_3$ and then discharge $C_1+C_2$ to $V_{OUT1}$, $C_2+C_3$ to $V_{OUT1}$, and then $C_3+C_1$ to $V_{OUT1}$. In another embodiment of the invention, the switching sequence may comprise charging $C_1$ to between $V_{IN}$ and $V_{OUT1}$, $C_2$ to between $V_{IN}$ and $V_{OUT1}$ then discharge $C_1+C_2$ to $V_{OUT1}$.

In instances where the input voltage, $V_{IN}$, may be equal 3.3V, and the desired output voltage, $V_{OUT1}$ may be equal to 1.2V, the charge sequence may comprise: charge 1.1 V to $C_1+C_2+C_3$, and discharge: $C_1+C_2$ such that $C_1=0.6V$, $C_2=0.6V$, and $C_3=1.1V$, followed by a charge of $C_1+C_2+C_3$. Depending on what voltage may exist on each capacitor when the charge cycle starts, the state machine may decide to charge only two capacitors to maximize efficiency.

This sequence may not repeat cleanly as the capacitors may not maintain equal voltages and charges. To optimize efficiency, when the capacitors may be charged and discharged, the voltage change during that cycle may be as small as possible.

Series resistors added in the switch paths in the switch array 303, indicated by $R_{1A}, R_{1B}, \ldots, R_{NA}$, and $R_{NB}$, may reduce the peak currents that occur when the capacitors may be charged. This resistors $R_{1A}, R_{1B}, \ldots, R_{NA}$, and $R_{NB}$ may have a dynamic value to help regulate the current values versus the switching frequency and capacitor values. The resistors $R_{1A}, R_{1B}, \ldots, R_{NA}$, and $R_{NB}$ may also be used to help the state machine 305 manage the voltages across the capacitors. A large resistor value in the switch will reduce the charge delivered and may reduce the efficiency for that charge cycle but may leave the capacitor voltages at an optimum voltage to get the maximum efficiency in the next or subsequent cycles. The resistance may be obtained for free by regulating the drive current in the CMOS switches that comprise the switch array 303.

The state machine 305 may regulate the output current on a port to provide constant current output capability, for example, by regulating the amount of charge delivered. For example, the state machine may reduce the frequency of the charge cycles. This may provide important advantages in instances where output ports may need to regulate the maximum current delivered such as for LED drivers, battery chargers, and/or current limited/short circuit protected outputs, for example.

The ripple voltage on the output ports may depend on the capacitance values $C_1, C_2, \ldots C_N$, capacitor equivalent series resistance (ESR) values, switching frequencies, and sequence efficiency. The state machine 305 switching sequence may be modified in order to move switching noise away from certain frequencies which may be harmful to parts of the wireless system 150.

Figure 4:
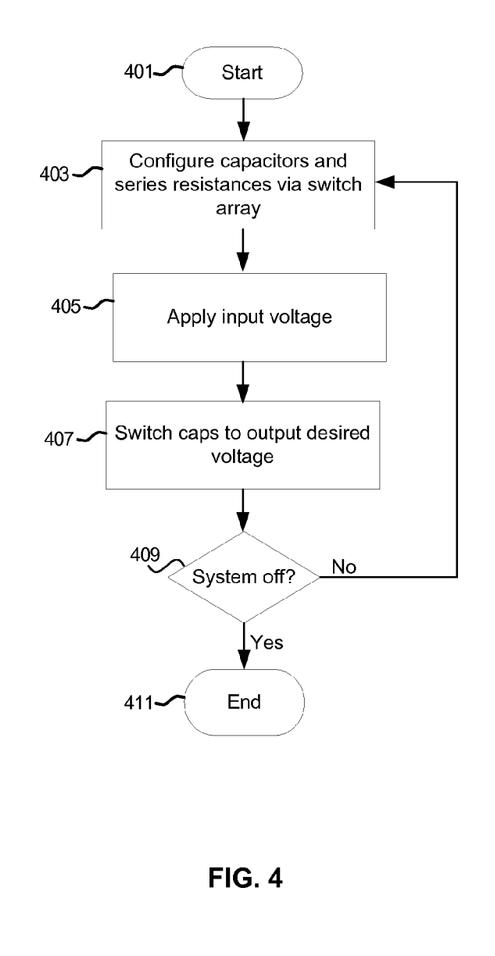
FIG. 4 is a block diagram illustrating exemplary steps for capacitive power conversion, in accordance with an embodiment of the invention.

FIG. 4 is a block diagram illustrating exemplary steps for capacitive power conversion, in accordance with an embodiment of the invention. Referring to FIG. 4, in step 403, following start step 401, the capacitors $C_1, C_2, \ldots C_N$ and series resistances in the switch array 303 may be configured to accept charge from the input voltage $V_{IN}$ in step 405, followed by step 407, where the switch array 303 may switch the charged capacitors $C_1, C_2, \ldots C_N$ to the appropriate output port or ports of the switch array 303. In step 409, in instances where the wireless system 150 is not switched off, the process may step back to step 403 to repeat the process. In step 409, in instances where the wireless system 150 is turned off, the process may proceed to end step 411.

In an embodiment of the invention, a method and system are disclosed for charging one or more input capacitors $C_1, C_2, \ldots C_N$ via an input voltage $V_{IN}$. One or more output voltages may be generated on a chip 100 by switching one or more of the charged input capacitors $C_1, C_2, \ldots C_N$ to one or more output capacitors 311A, 311B via a switch array 303 on the chip 100. The switch array 303 may be controlled via a state machine 305. A constant current may be generated for the one or more output voltages $V_{OUT1}$, $V_{OUT2}$ via one or more current comparators and/or a constant voltage may be generated for the one or more output voltages via one or more voltage comparators. A variable resistance $R_{1A}$, $R_{1B}$, ..., $R_{NA}$, and $R_{NB}$ may be coupled in series with one or more switches in the switch array 303. The one or more input capacitors $C_1, C_2, \ldots C_N$ may be discrete capacitors external to the chip 100 or integrated within the chip 100. One or more of the output voltages $V_{OUT1}$, $V_{OUT2}$ may be greater than the input voltage $V_{IN}$, or may be less than the input voltage $V_{IN}$.

Certain embodiments of the invention may comprise a machine and/or computer readable storage having stored thereon, a machine code and/or a computer program having at least one code section for integrated circuit power control, the at least one code section being executable by a machine and/or a computer for causing the machine and/or computer to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. One embodiment utilizes a commercially available processor, which may be implemented external to an ASIC implementation of the present system. Alternatively, in an embodiment where the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for power control, the method comprising:
   charging one or more input capacitors in a voltage converter on a chip via an input voltage to said chip; and
   generating a plurality of output voltages on said chip by switching said one or more charged input capacitors to one or more output capacitors via a switch array on said chip.

2. The method according to claim 1, comprising controlling said switch array via a state machine.

3. The method according to claim 2, comprising generating a constant current for said plurality of output voltages via one or more current comparators.

4. The method according to claim 2, comprising generating a constant voltage for said plurality of output voltages via one or more voltage comparators.

5. The method according to claim 1, comprising inserting a resistance in series with one or more switches in said switch array.

6. The method according to claim 5, wherein said series resistances are variable.

7. The method according to claim 1, wherein said one or more input capacitors are discrete capacitors external to said chip.

8. The method according to claim 1, wherein said one or more input capacitors are integrated within said chip.

9. The method according to claim 1, wherein one or more of said plurality of output voltages are greater than said input voltage.

10. The method according to claim 1, wherein one or more of said plurality of output voltages are less than said input voltage.

11. A system for power control, the system comprising:
one or more circuits on a chip, said one or more circuits comprising one or more input capacitors, one or more output capacitors and a switch array integrated on said chip, wherein said one or more circuits charges said one or more input capacitors via an input voltage; and
said one or more circuits generates a plurality of output voltages on said chip by switching said charged one or more input capacitors to said one or more output capacitors via said on-chip switch array.

12. The system according to claim 11, wherein said one or more circuits controls said switch array via a state machine.

13. The system according to claim 12, wherein said one or more circuits comprises one or more current comparators and said one or more circuits generates a constant current for said plurality of output voltages via said one or more current comparators.

14. The system according to claim 12, wherein said one or more circuits comprises one or more voltage comparators and said one or more circuits generates a constant voltage for said plurality of output voltages via said one or more voltage comparators.

15. The system according to claim 11, wherein said one or more circuits comprises one or more switches in said switch array, and said one or more circuits provides a resistance in series with said one or more switches in said switch array.

16. The system according to claim 15, wherein said series resistances are variable.

17. The system according to claim 11, wherein said one or more input capacitors are discrete capacitors external to said chip.

18. The system according to claim 11, wherein said one or more input capacitors are integrated within said chip.

19. The system according to claim 11, wherein one or more of said plurality of output voltages are greater than said input voltage.

20. The system according to claim 11, wherein one or more of said plurality of output voltages are less than said input voltage.

* * * * *